United States Patent
Garbe et al.

(10) Patent No.: US 7,232,983 B2
(45) Date of Patent: Jun. 19, 2007

(54) CIRCUIT ARRANGEMENT WITH NON-VOLATILE MEMORY MODULE AND METHOD FOR REGISTERING LIGHT-ATTACKS ON THE NON-VOLATILE MEMORY MODULE

(75) Inventors: Joachim C. H. Garbe, Schenefeld (DE); Wolfgang Buhr, Hamburg (DE)

(73) Assignee: NXP B.V., Eindhoven (NL)

( * ) Notice: Subject to any disclaimer, the term of this patent is extended or adjusted under 35 U.S.C. 154(b) by 50 days.

(21) Appl. No.: 10/536,302

(22) PCT Filed: Nov. 13, 2003

(86) PCT No.: PCT/IB03/05148

§ 371 (c)(1),
(2), (4) Date: May 19, 1990

(87) PCT Pub. No.: WO2004/049349

PCT Pub. Date: Jun. 10, 2004

(65) Prior Publication Data

US 2006/0011816 A1    Jan. 19, 2006

(30) Foreign Application Priority Data

Nov. 22, 2002    (DE) ................ 102 54 659

(51) Int. Cl.
*H01J 40/14*    (2006.01)
(52) U.S. Cl. ................................. 250/214 R
(58) Field of Classification Search .......... 250/214 R, 250/221, 214 AL; 365/195, 196, 218
See application file for complete search history.

(56) References Cited

U.S. PATENT DOCUMENTS 5,053,992 A * 10/1991 Gilberg et al. ......... 365/185.04
5,465,349 A * 11/1995 Geronimi et al. ............. 714/30
2002/0130248 A1   9/2002 Bretschneider et al.

* cited by examiner

*Primary Examiner*—Kevin Pyo

(57) ABSTRACT

In order to further develop a circuit arrangement (100) for electronic data communication, comprising—at least a non-volatile memory module (10) for storing data, and—at least an interface logic (20) associated with the memory module (10)—for addressing the memory module (10) and—for writing data to the memory module (10) or—for reading data from the memory module (10), together with a related method for registering light attacks on the non-volatile memory module (10), in such a way that, firstly, the light attack is recognized immediately and reliably regardless of whether an access, in particular a read access, to the memory module (10) is taking place or not and, secondly, the entire address space of the memory module (10) is covered as uniformly as possible in this regard, it is proposed that at least a monitoring arrangement (22) provided for monitoring the memory module (10) is associated with the interface logic (20), by means of which monitoring arrangement (22) an irradiation of the memory module (10) with at least a light source [so-called "light attack"] can be detected and/or registered and/or signaled in a test mode (T) in which no write or read access to the memory module (10) takes place.

8 Claims, 1 Drawing Sheet

Figure 1:
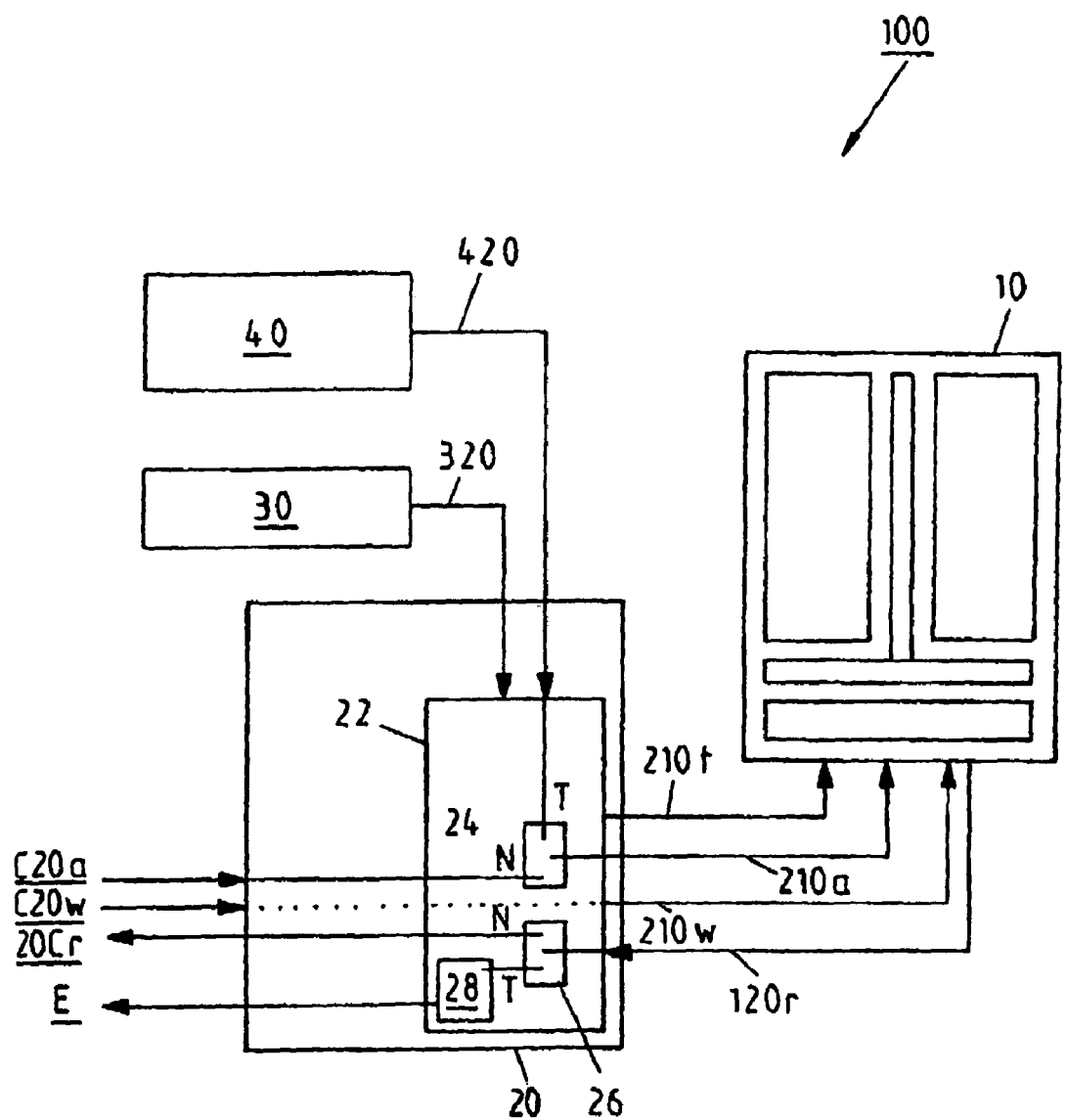

CIRCUIT ARRANGEMENT WITH NON-VOLATILE MEMORY MODULE AND METHOD FOR REGISTERING LIGHT-ATTACKS ON THE NON-VOLATILE MEMORY MODULE

This application is a national stage of PCT/IB03/05148 filed on Nov. 13, 2003.

The present invention relates to a circuit arrangement for electronic data processing, comprising
- at least a non-volatile memory module for storing data,
- at least an interface logic associated with the memory module,
- for addressing the memory module and,
- for writing data to the memory module or,
- for reading data from the memory module.

The present invention further relates to a method for detecting and/or registering and/or signaling the irradiation of at least a non-volatile memory module with at least a light source (so-called "light attack" on the non-volatile memory module).

Electronic modules, such as E[rasable]P[rogrammable]R[ead]O[nly]M[emory], E[lectrically]E[rasable]P[rogrammable]R[ead]O[nly]M[emory] or flash memories, permit the writing and/or reading of digital data in the form of "1" and "0", which are frequently referred to as the written or erased state (bit). Incorrect reading of these data can be caused by external influences, such as, for example, irradiation with strong light sources (so-called "light attack" or "light flash attack").

This incorrect reading of the data from the non-volatile memory module (so-called N[on]V[olatile] memory) can be countered, for example, by using an error correction code in which the information is stored redundantly on the physical medium and an algorithm examines these specific data for errors when the data are read in.

Algorithms which can recognize and/or correct one or more faulty bits (known examples are Hamming codes) in a memory block of, for example, eight logical bits (to which more than eight physical bits correspond) are typically used.

For reasons of efficiency and cost, the algorithm used for error recognition in the case of the error correction code can never recognize all the errors which are in principle possible, but is always restricted to recognizing and, if needed, correcting relatively few bits per memory block. In security-critical applications this is not always sufficient, especially when a few characteristic error patterns in the bits occur very much more often than other error patterns or can be produced deliberately by external manipulation.

For example, when coding the counter for the money entered on a money card, care must always be taken to ensure that the physically stable state, that is, the state to which the data memory might revert through physical processes after many years, corresponds to an empty account status, so that the card cannot be loaded with more money in an unauthorized manner.

Other possible ways of resisting light attacks are, for example, double read access to the data (so-called "read-verify mode") in which the results are compared, or reading of the data with switched-off wordlines before and after the actual read access. Switching off the wordlines has the result that in correct operation one and the same pattern is always read (so-called "read-known-answer mode"); deviations from this are an indication of an attack.

However, double read access measures, such as "read-verify mode" or "read-known-answer mode" can only recognize attacks that take place at the precise moment of the read access; this means, in other words, that a light (flash) attack on the NV memory module can conventionally be recognized only through deviations in the data read from the non-volatile memory module; outside this time window defined by the read access such sensors are "blind", since as a rule the error occurs only transiently during readout; in addition, the effective read access is prolonged when using these methods.

Finally, there are also dedicated light sensors which can be distributed over the memory module. Although such dedicated light sensors can detect light (flash) attacks at any time, they are small in comparison with the memory module and cannot therefore provide complete surface coverage. If the number of these sensors is increased, however, the space requirement for the memory module is also increased, which has a detrimental effect on its production costs.

Finally, a problem which arises in this context is that the deviations from the anticipated data in the case of a light (flash) attack can often be recognized only much later, since such deviations do not take effect immediately, or do so in a manner which cannot be immediately recognized as erroneous. If the N[on]V[olatile] memory is not read at the time of the light (flash) attack, the light (flash) attack is not recognized at all, except by the above-mentioned additional light sensors.

Starting from the above-described disadvantages and deficiencies and taking account of the state of the art which has been sketched, it is the object of the present invention to further develop a circuit arrangement of the above-mentioned type, and a related method for registering light attacks on the non-volatile memory module, in such a way that, firstly, regardless of whether an access, in particular a read access, is currently being carried out, the light attack is recognized immediately and reliably and, secondly, the entire address space of the memory module is covered as uniformly as possible in this regard.

This object is achieved by a circuit arrangement with the features specified in claim 1, and by a related method for registering light attacks on the non-volatile memory module with the features specified in claim 7. Advantageous embodiments and useful refinements of the present invention are characterized in the respective dependent claims.

According to the teaching of the present invention, therefore, an entirely novel approach to the detection, registering and/or signaling of light (flash) attacks on non-volatile memory modules (so-called N[on]V[olatile] memories) is disclosed. This method may also be referred to as a "flash attack watchdog", the term "watchdog" being understood in this context to refer to a technology which serves to provide cyclical monitoring of devices, connections or software.

The present invention is based on the fact that the circuit arrangement has at least a monitoring arrangement (so-called "flash watchdog logic") which, whenever no other accessing of the memory module is taking place, reads this non-volatile memory module with the source transistor switched off, using at least a random number generator of randomly generated addresses, which usefully cover the entire memory space of the memory module as uniformly as possible.

To carry out the above-described method, the circuit arrangement, and in particular the interface logic associated with the non-volatile memory module, is extended according to the invention by at least a monitoring arrangement (so-called "flash watchdog logic") which, (only) when no other access requests to the memory module exist, disables the source transistor or source transistors of the memory module by means of the test mode interface and in this test mode cyclically reads out the addresses of the memory module and compares them to the respective address value for unprogrammed cells.

If the value of the addresses read from the memory module in the test mode cycle deviates from the expectation or target value, the "flash watchdog logic" triggers an immediate exception state (so-called "immediate hardware exception") which then displays and notifies a detected light attack on the memory module to the operating system (the so-called O[perating]S[system]).

If, however, the value of the addresses read from the memory module in the test mode cycle coincides with the anticipated value or expectation value, the "flash watchdog logic" reads the further addresses of the memory module until this process is interrupted by an access request, in particular a read request, to the memory module made by the C[entral]P[rocessing]U[nit] and/or by a coprocessor (hereinafter, and in the claims, the term "C[entral]P[rocessing]U[nit]" should always be understood to mean "C[entral]P[rocessing]U[nit] and/or coprocessor".

The person skilled in the art of detecting light (flash) attacks on non-volatile memory modules will appreciate in particular, with regard to the circuit arrangement according to the present invention and with regard to the method according to the present invention, that the probability that a light (flash) attack is not detected during a (read) accessing of the memory module is very small, since there is a very high probability that the duration of the light flash in the case of a light (flash) attack will exceed the duration of executing a plurality of instructions coming from the CPU.

According to an especially inventive refinement, the datum for the non-conducting memory cell is expected by the reading of the non-volatile memory module (N[on]V[olatile] memory module) in test mode, i.e. in the disabled state of the source transistor of the memory module. This means, in other words, that a value deviating from this datum points unambiguously to external influencing of the reader unit or the memory cell; a light (flash) attack directed at the memory module which directly influences the sense amplifier by supplying charge, and therefore changes the datum read from the memory module, can be immediately and reliably detected in this way.

To increase the degree of security from light (flash) attacks, in a preferred embodiment of the present invention each read access to the non-volatile memory module can initially take place once with the source transistor of the memory module switched off, before the read access takes place with the source transistor switched on. In this way, testing for a light (flash) attack is possible before each accessing of the memory module (admittedly with slightly increased access time of the memory module).

To sum up, the advantage of the circuit arrangement according to the present invention and of the method according to the present invention lies in the unequivocal recognition of a light (flash) attack with an immediate reaction in the form of the signaling of at least an exception, this being done when no access to the memory module is taking place. Through the use according to the invention of randomly generated addresses the total memory space of the memory module is covered as uniformly as possible; that is, in total all the address spaces of the memory module are encompassed.

The present invention further relates to a microcontroller, in particular an embedded security controller, including at least a data processing arrangement of the above-described type. Accordingly, the above-described method can preferably be incorporated, for example, in all smartcard developments.

Finally, the present invention relates to the use of at least a circuit arrangement of the above-described type in at least a chip unit, in particular in at least an embedded security controller.

As already discussed, there are various possible ways of advantageously implementing and further developing the teaching of the present invention. In this regard, reference is made to the appended claims in claim 1 and in claim 7.

These and other aspects of the invention are apparent from and will be elucidated with reference to the embodiments described hereinafter.

In the drawing:

FIG. 1 shows in a schematic block diagram an embodiment of a circuit arrangement according to the present invention by means of which the method according to the present invention can be carried out.

In FIG. 1, an embodiment of a circuit arrangement 100 for electronic data processing is illustrated; in particular, the circuit arrangement 100 is provided for use in a microcontroller of the embedded security controller type.

This circuit arrangement 100 comprises a multi-component non-volatile memory module 10 (so-called N[on]V[olatile] memory) which is in the form of an E[lectrically]E[rasable]P[rogrammable]R[ead]O[nly]M[emory] and by means of which data can be stored.

Associated with this N[on]V[olatile] memory module 10 is an interface logic 20 by means of which the memory module 10 can be addressed (--> reference 210a: address data "ADDR(a:0)" from interface logic 20 to memory module 10), the memory module 10 can be written (--> reference 210w: signal data "DIN(d:0)" from interface logic 20 to memory module 10) and the memory module 10 can be read (--> reference 120r: signal data "DOUT(d:0)" from memory module 10 to interface logic 20).

The special feature of the circuit arrangement 100 according to FIG. 1 is to be seen in the fact that a monitoring arrangement 22 for monitoring the memory module 10 is associated with the interface logic 20, by means of which monitoring arrangement 22 irradiation of the memory module 10 with a light source (so-called "light attack") can be detected, registered and signaled in a test mode T, in which no read access to the memory module 10 takes place.

For this purpose at least a timer/clock unit 30 for supplying regular time intervals or clock signals (--> reference 320) for cyclical operation of the monitoring arrangement 22 and at least a random number generator 40 for generating random numbers (-->reference 420) for the monitoring arrangement 22 are associated with the monitoring arrangement 22.

The connection between the monitoring arrangement 22 and the random number generator 40 according to the embodiment in FIG. 1 is provided via an addressing multiplex unit 24 which is integrated in the monitoring arrangement 22 and has two inputs:

an input for the normal mode N for address data "CPU NV addr" (-->reference C20a) coming from a C[entral]P[rocessing]U[nit] and an input for the test mode T for random address data (-->reference 420) coming from the random number generator 40; that is, the test mode input receives random numbers generated by the random number generator 40 for random memory module addressing.

Accordingly, the addressing multiplex unit 24 is used for switching between the memory module addressing (=normal mode N) coming from the CPU when the memory module 10 is accessed, and the random memory module addressing (=test mode T) generated by means of the random number generator 40 when the memory module 10 is being monitored; depending on whether the normal mode N or the test mode T is currently activated, the memory module addressing (-->normal mode N) coming from the CPU or the random memory module addressing (-->test mode T) generated by means of the random number generator 40 is communicated to the memory module 10 as address data 210a.

Also arranged in the monitoring arrangement 22 is an access multiplex unit 26, the input of which receives the signal data 120r from the memory module 10. The access multiplex unit 26 has two outputs:

- an output for the normal mode N for connecting with the CPU (-->reference 20Cr) and
- an output for the test mode T for connecting with a pattern detection unit 28.

Accordingly, the access multiplex unit 26 is used for switching the signal data coming from the reading of the memory module 10 between the connection to the CPU and the memory detection unit 28 provided for comparing the random address values of the memory module 10 with address values of unprogrammed memory cells. In case of lack of agreement between the address values to be compared, i.e. in case of a detected light (flash) attack, an exception state E [so-called "hardware exception"] is triggered by this pattern detection unit 28.

As indicated above, two operating states are distinguished in the process functions of this circuit arrangement 100 according to FIG. 1:

(i) normal mode N with the source transistor of the memory module 10 switched on (test mode data "DAW=0"; cf. reference 210t), that is, in the time intervals in which a read access to the memory module 10 takes place
 the memory module addressing in the addressing multiplex unit 24 and
 the connection to the CPU in the access multiplex unit 26 are connected;

(ii) test mode T or "flash attack detect mode" with the source transistor of the memory module 10 switched off (test mode data "DAW=1"; cf. reference 210t), that is, in the time intervals in which no read access to the memory module 10 takes place
 the random memory module addressing in the addressing multiplex unit 24 and
 the pattern detecting unit 28 in the access multiplex unit 26 are connected.

Consequently, the core of the present invention lies in the fact that by means of the circuit arrangement 100 according to FIG. 1 a method for detecting, registering and signaling the irradiation of the non-volatile memory module 10 with a light source (so-called "light attack" on the non-volatile memory module 10) can be carried out, whereby, in regular time periods triggered by the timer/clock unit 30 by means of the cyclical timer/clock signal "slowclk" (-->reference 320), the memory module 10 is read in test mode T (<--> DAW=1; cf. reference 210t) with a random address which is generated by the interface logic 20 via the random addressing "RND(r:0)" (-->reference 420).

The value of the data read from the memory module 10 in test mode T (<--> DAW=1; cf. reference 210t) is then checked by the pattern detection unit 28 and compared to the specific expectation or target value of the type of memory module 10 being used. If the readout datum differs by at least a bit from the expectation or target value of the type of memory module 10 being used, an exception state E (so-called "hardware exception") is triggered by the pattern detection unit 28 in order to cause an immediate reaction of the CPU to the light (flash) attack.

LIST OF REFERENCE CHARACTERS

100 Circuit arrangement for electronic data processing
10 Non-volatile memory module or N[on]V[olatile] memory
20 Interface logic
22 Monitoring arrangement
24 Addressing multiplex unit
26 Access multiplex unit
28 Pattern detection unit
30 Timer/clock unit
40 Random number generator
210a Address data "ADDR(a:0)" from interface logic 20 to memory module 10
120r Signal data "DOUT(d:0)" from memory module 10 to interface logic 20
210t Test mode data "DAW" from interface logic 20 to memory module 10
210w Signal data "DIN(d:0)" from interface logic 20 to memory module 10
320 In particular, cyclical timer/clock signal "slowclk" from timer/clock unit 30 to interface logic 20
420 Random number signal "RND(r:0)" from random number generator 40 to interface logic 20
C20a Address data "CPU NV addr" from CPU to interface logic 20
20Cr Signal data "CPU NV read data" from interface logic 20 to CPU
C20w Signal data "CPU NV write data" from CPU to interface logic 20
E Exception state ["hardware exception"]
N Normal (read) mode with test mode datum DAW=0
T Test mode with test mode datum DAW=1

The invention claimed is:

1. A circuit arrangement for electronic data processing, comprising:
 at least a non-volatile memory module for storing data, and
 at least an interface logic associated with the memory module, for addressing the memory module and, for writing data to the memory module or, for reading data from the memory module,
 at least a monitoring arrangement provided for monitoring the memory module is associated with the interface logic, wherein the monitoring arrangement is adapted to detect an irradiation of the memory module with at least a light source can be detected and/or registered and/or signaled in a test mode in which no write or read access to the memory module takes place, and
 at least a timer/clock unit for supplying regular time intervals or clock signals for the monitoring arrangement and at least a random number generator for generating random numbers for the monitoring arrangement are associated with the monitoring unit.

2. A circuit arrangement as claimed in claim 1, wherein the monitoring arrangement further comprises:
 at least an addressing multiplex unit for switching between at least a memory module addressing coming from at least a central processing unit (CPU) when the memory module is accessed and at least a random memory module addressing generated by means of the random number generator while the memory module is monitored, and at least an access multiplex unit for switching the signal data coming from the reading of the memory module 10 between at least a connection to the CPU and at least a pattern detection unit provided for comparing the random address values of the memory module with address values of unprogrammed memory cells, by which at least an exception state can be triggered in case of a lack of agreement between the address values to be compared.

3. A circuit arrangement as claimed in claim 2, wherein in the time intervals in which a read access to the memory module takes place in the addressing multiplex unit the memory module addressing and in the access multiplex unit the connection to the CPU are connected; and in the time intervals in which no write or read access to the memory module takes place in the addressing multiplex unit the random memory module addressing and in the access multiplex unit the pattern detection unit are connected.

4. A circuit arrangement as claimed in claim 1, wherein the memory module is configured as at least an erasable programmable read only memory (EPROM), or at least an electrically erasable programmable read only memory (EEPROM), or at least a flash memory.

5. A microcontroller comprising at least a circuit arrangement as claimed in claim 1.

6. A use of at least a circuit arrangement as claimed in claim 1 in at least a chip unit.

7. A method for detecting and/or registering and/or signaling the irradiation of at least a non-volatile memory module with at least a light source, the method comprising:

in a test mode in which no write or read access to the memory module takes place monitoring the memory for light attacks by means of at least a monitoring arrangement associated with at least an interface logic; and in the test mode for monitoring the memory module comparing random address values of the memory module generated by means of at least a random memory module addressing to address values of unprogrammed memory cells and in case of a lack of agreement between the address values to be compared triggering at least an exception state.

8. A method as claimed in claim 7, wherein before each read access to the memory module activating the monitoring arrangement at least once.

* * * * *